(12) United States Patent
Yustus et al.

(10) Patent No.: US 10,513,214 B2
(45) Date of Patent: Dec. 24, 2019

(54) SELF-DEPLOYING TELESCOPING JIB CRANE SYSTEM

(71) Applicant: Konecranes Global Corporation, Hyvinkää (FI)

(72) Inventors: Joseph A. Yustus, Hartford, WI (US); Joel Chellman, Kenosha, WI (US)

(73) Assignee: Konecranes Global Corporation, Hyvinkää (FI)

( * ) Notice: Subject to any disclaimer, the term of this patent is extended or adjusted under 35 U.S.C. 154(b) by 0 days.

(21) Appl. No.: 16/113,562

(22) Filed: Aug. 27, 2018

(65) Prior Publication Data

US 2018/0361902 A1 Dec. 20, 2018

Related U.S. Application Data

(63) Continuation of application No. 14/865,916, filed on Sep. 25, 2015, now Pat. No. 10,086,739.

(60) Provisional application No. 62/055,145, filed on Sep. 25, 2014.

(51) Int. Cl.
| | |
|---|---|
| *B60P 1/54* | (2006.01) |
| *B66C 23/18* | (2006.01) |
| *B66C 23/80* | (2006.01) |
| *B65G 67/04* | (2006.01) |
| *B66C 13/16* | (2006.01) |
| *B66C 23/16* | (2006.01) |
| *B66C 23/42* | (2006.01) |
| *B66C 23/00* | (2006.01) |
| *B66C 23/68* | (2006.01) |

(52) U.S. Cl.
CPC ............. *B60P 1/548* (2013.01); *B65G 67/04* (2013.01); *B66C 13/16* (2013.01); *B66C 23/16* (2013.01); *B66C 23/18* (2013.01); *B66C 23/42* (2013.01); *B66C 23/54* (2013.01); *B66C 23/68* (2013.01); *B66C 23/80* (2013.01)

(58) Field of Classification Search
CPC ....... B60P 1/5471; B60P 1/5476; B60P 1/548; B66C 23/42; B66C 23/44
USPC ....................................................... 414/543
See application file for complete search history.

(56) References Cited

U.S. PATENT DOCUMENTS

| | | |
|---|---|---|
| 3,777,919 A | 12/1973 | Konijn |
| 3,944,081 A | 3/1976 | Wellman |
| 4,111,316 A | 9/1978 | Wappler |
| 4,260,064 A | 4/1981 | Ekstam |

(Continued)

FOREIGN PATENT DOCUMENTS

| | | |
|---|---|---|
| EP | 2327654 | 6/2011 |
| WO | 2005108685 | 11/2005 |
| WO | 2014046213 | 3/2014 |

OTHER PUBLICATIONS

European Search Report for Application No. EP15186909 dated Feb. 11, 2016 (3 pages).

*Primary Examiner* — Jonathan Snelting
(74) *Attorney, Agent, or Firm* — Michael Best & Friedrich LLP

(57) ABSTRACT

A crane system includes a skid assembly having an operator base and plurality of outrigger assemblies coupled to the operator base that support and lift the base from a first elevation to a second elevation. The crane system also includes a jib crane coupled to the skid assembly. The jib crane includes a pillar assembly coupled to the skid assembly and a boom assembly coupled to the pillar assembly.

20 Claims, 5 Drawing Sheets

(56) References Cited

U.S. PATENT DOCUMENTS

| | | | | |
|---|---|---|---|---|
| 4,479,750 | A | * | 10/1984 | Johnson, Jr. .......... B65G 67/02 |
| | | | | 254/45 |
| 4,596,336 | A | | 6/1986 | Zwagerman |
| 4,953,722 | A | | 9/1990 | Becker et al. |
| 5,014,863 | A | | 5/1991 | Vlaanderen |
| 5,431,526 | A | | 7/1995 | Peterson et al. |
| 5,490,755 | A | * | 2/1996 | Billotte ................. B60K 17/14 |
| | | | | 180/24.03 |
| 5,642,821 | A | | 7/1997 | Häfliger |
| 5,769,251 | A | | 6/1998 | Wada et al. |
| 6,341,705 | B1 | | 1/2002 | Kaspar |
| 7,328,810 | B1 | | 2/2008 | Rhodes |
| 7,686,561 | B2 | * | 3/2010 | Smith ..................... B66C 3/16 |
| | | | | 212/301 |
| 8,636,460 | B1 | * | 1/2014 | Coots .................... E02F 9/003 |
| | | | | 414/394 |
| 2009/0116947 | A1 | | 5/2009 | Piccioni et al. |

\* cited by examiner

SELF-DEPLOYING TELESCOPING JIB CRANE SYSTEM

CROSS-REFERENCE TO RELATED APPLICATIONS

This application is a continuation of U.S. patent application Ser. No. 14/865,916, filed on Sep. 25, 2015, which claims priority to U.S. Provisional Application No. 62/055,145, filed on Sep. 25, 2014, the contents of each of which are incorporated herein by reference in their entireties.

FIELD OF THE INVENTION

The present application relates generally to a crane system, and in particular to a jib crane system that is used to move materials such as barrels or other containers that contain radiological material.

BACKGROUND

Crane systems are commonly used to lift and move materials. However, there is a growing need for a crane system which is a self-contained material handling system within a concise footprint, and which can further be rapidly deployed in the handling of barrels or other containers that contain radiological material in remote locations.

SUMMARY

In accordance with one construction, a crane system includes a skid assembly having an operator base and plurality of outrigger assemblies coupled to the operator base that support and lift the base from a first elevation to a second elevation. The crane system also includes a jib crane coupled to the skid assembly. The jib crane includes a pillar assembly coupled to the skid assembly and a boom assembly coupled to the pillar assembly.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 1:
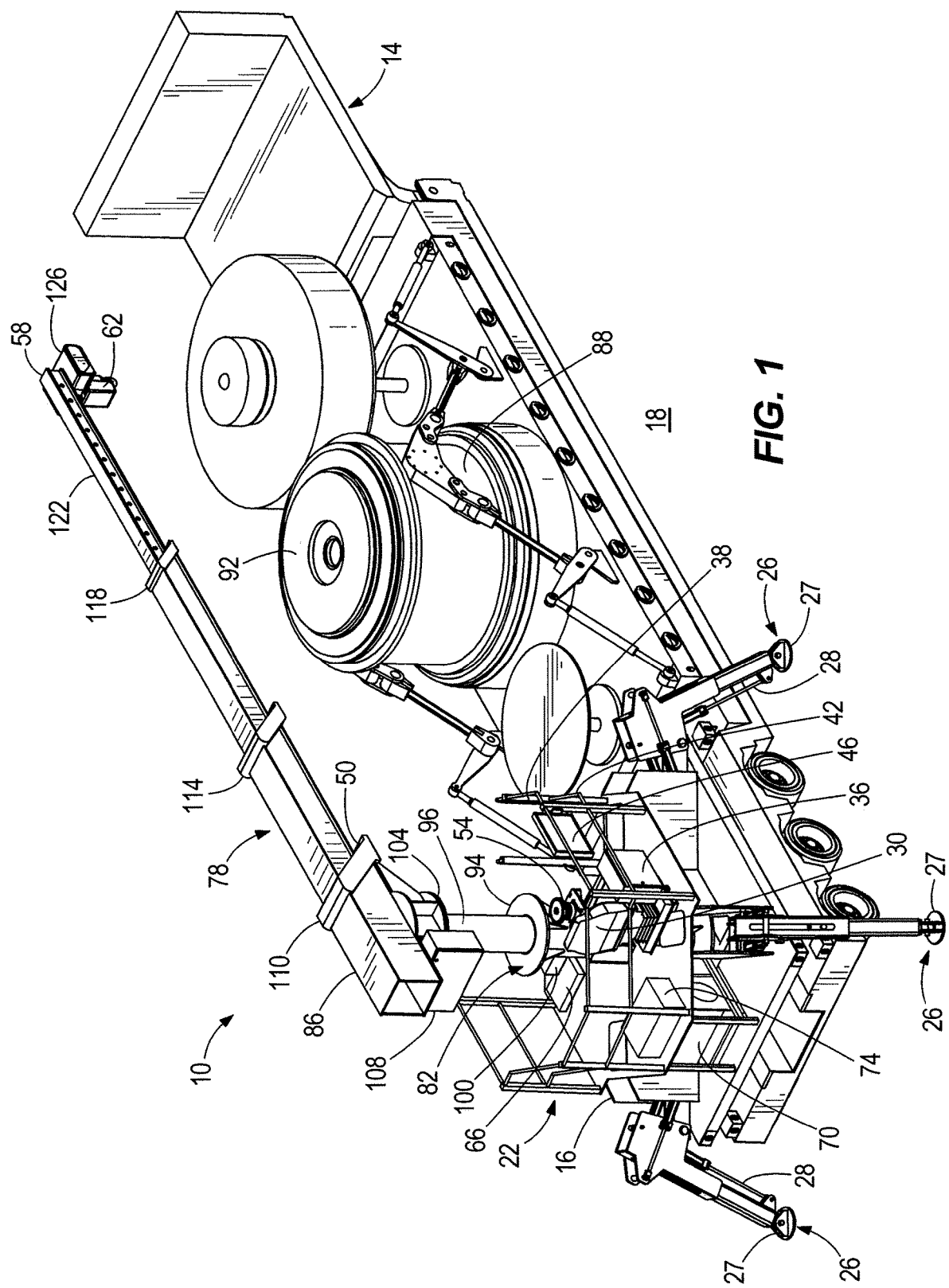
FIG. 1 is a perspective view of a fully-assembled crane system according to one construction disposed on a flatbed semi trailer, with a fully extended pillar assembly and boom assembly.
Figure 2:
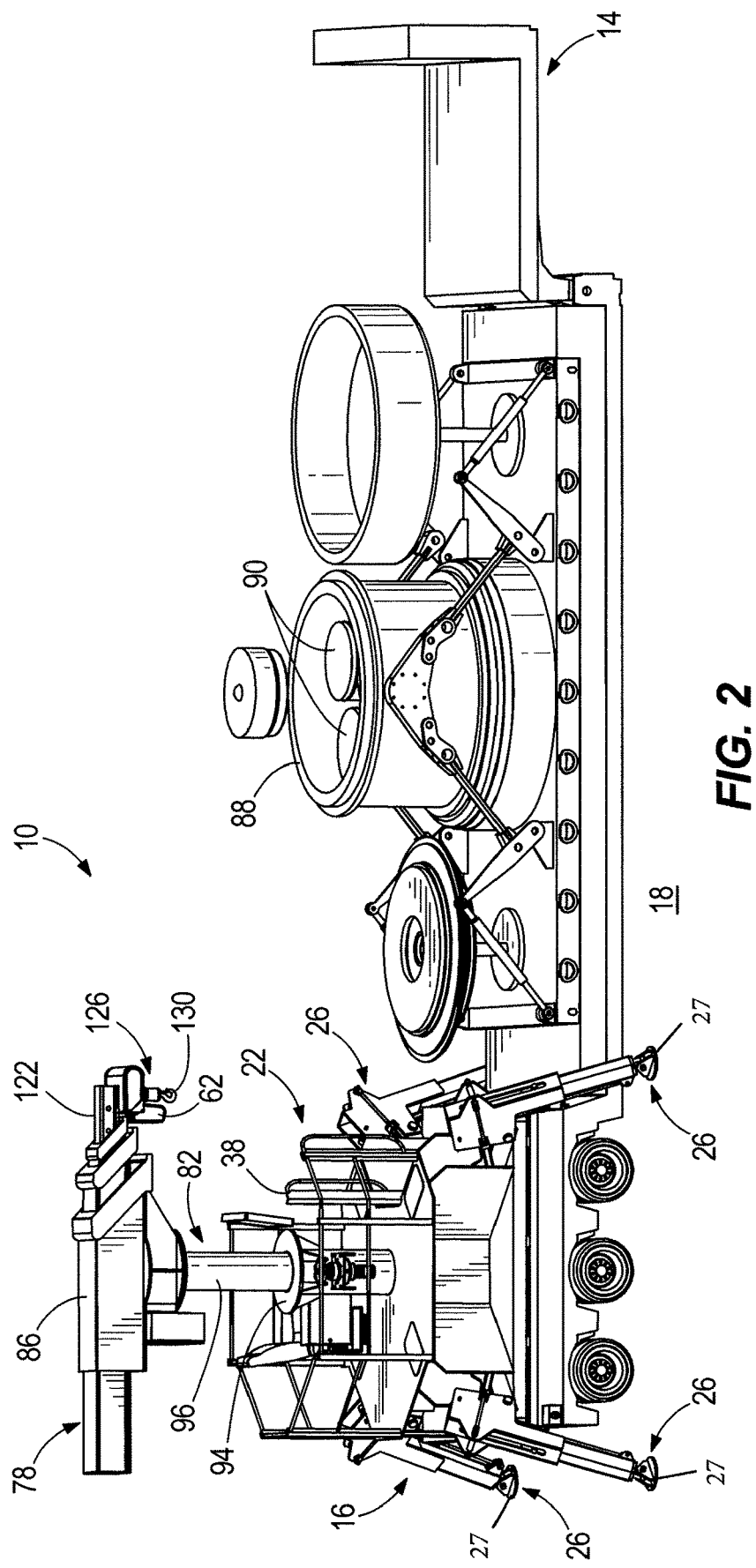
FIG. 2 is a side view of the fully-assembled crane system, illustrating a fully retracted boom assembly.
Figure 3:
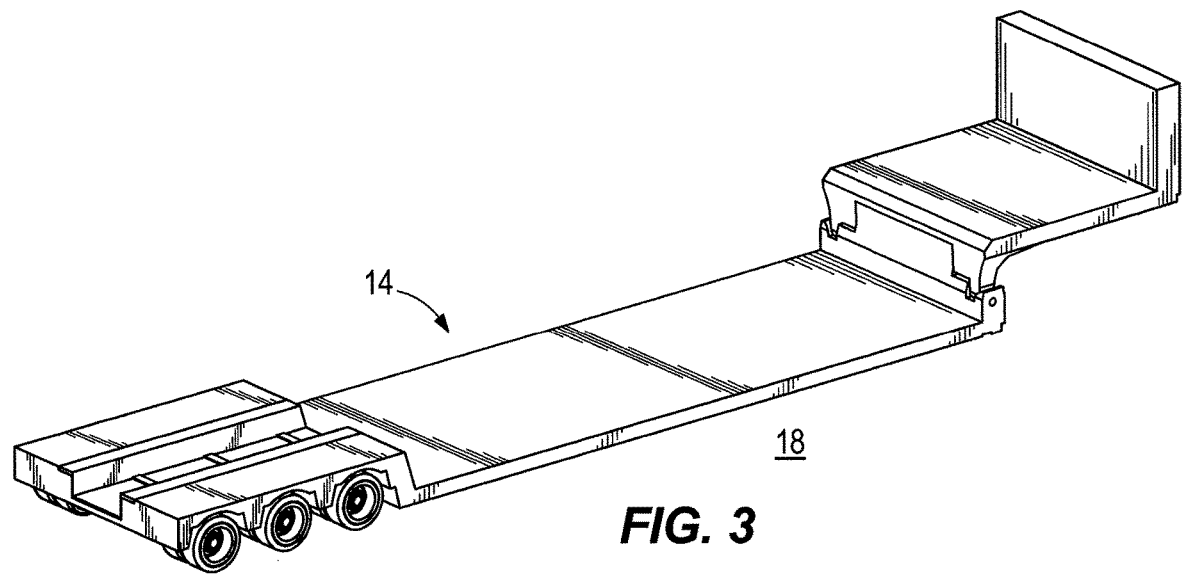
FIG. 3 is a perspective view of the flatbed semi trailer.
Figure 4:
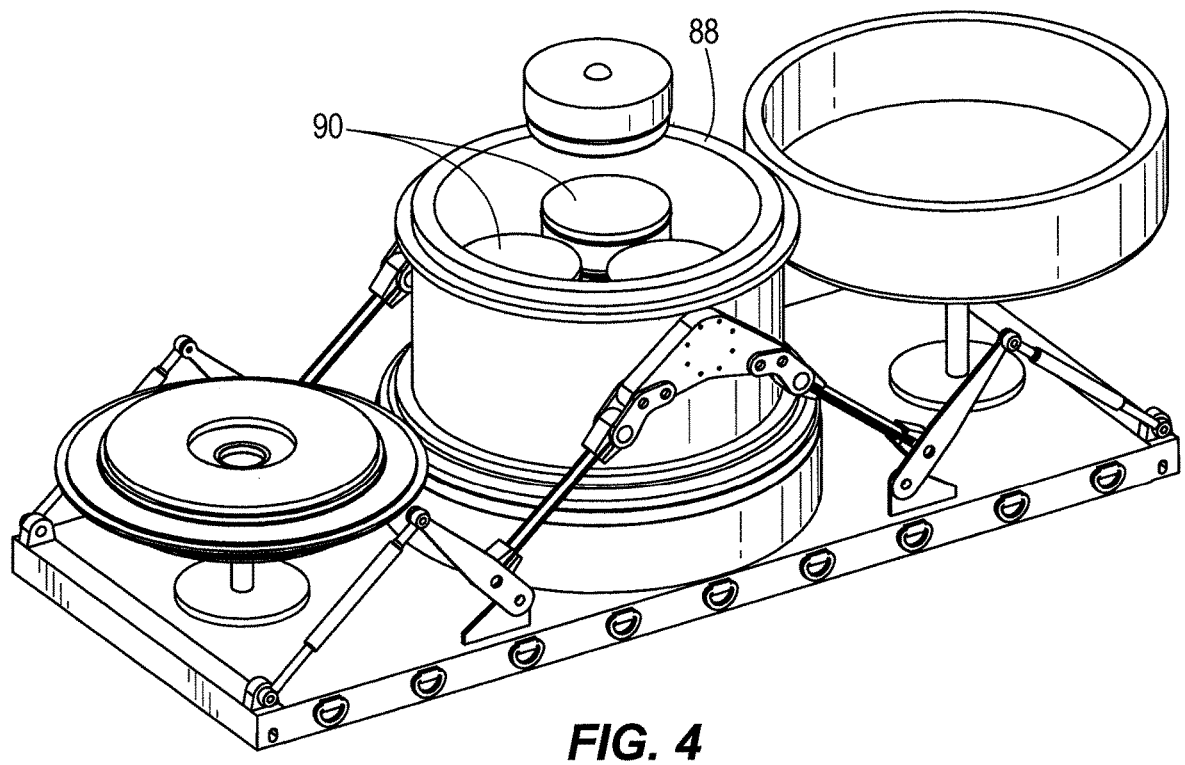
FIG. 4 is a perspective view of canisters and barrels that are carried by the flatbed semi trailer.

FIGS. 1 and 2 illustrate a crane system 10 coupled to a flatbed semi trailer 14 (e.g., a customer-supplied flatbed semi trailer). The crane system 10 includes a skid assembly 16 that provides stability to the crane system 10 and engages a ground surface 18. The skid assembly 16 inhibits sliding or movement of the crane system 10, and also lifts a portion of the crane system 10. In FIGS. 1 and 2 the skid assembly 16 is shown fully engaged with the ground surface 18 and fully un-stowed.

Figure 5:
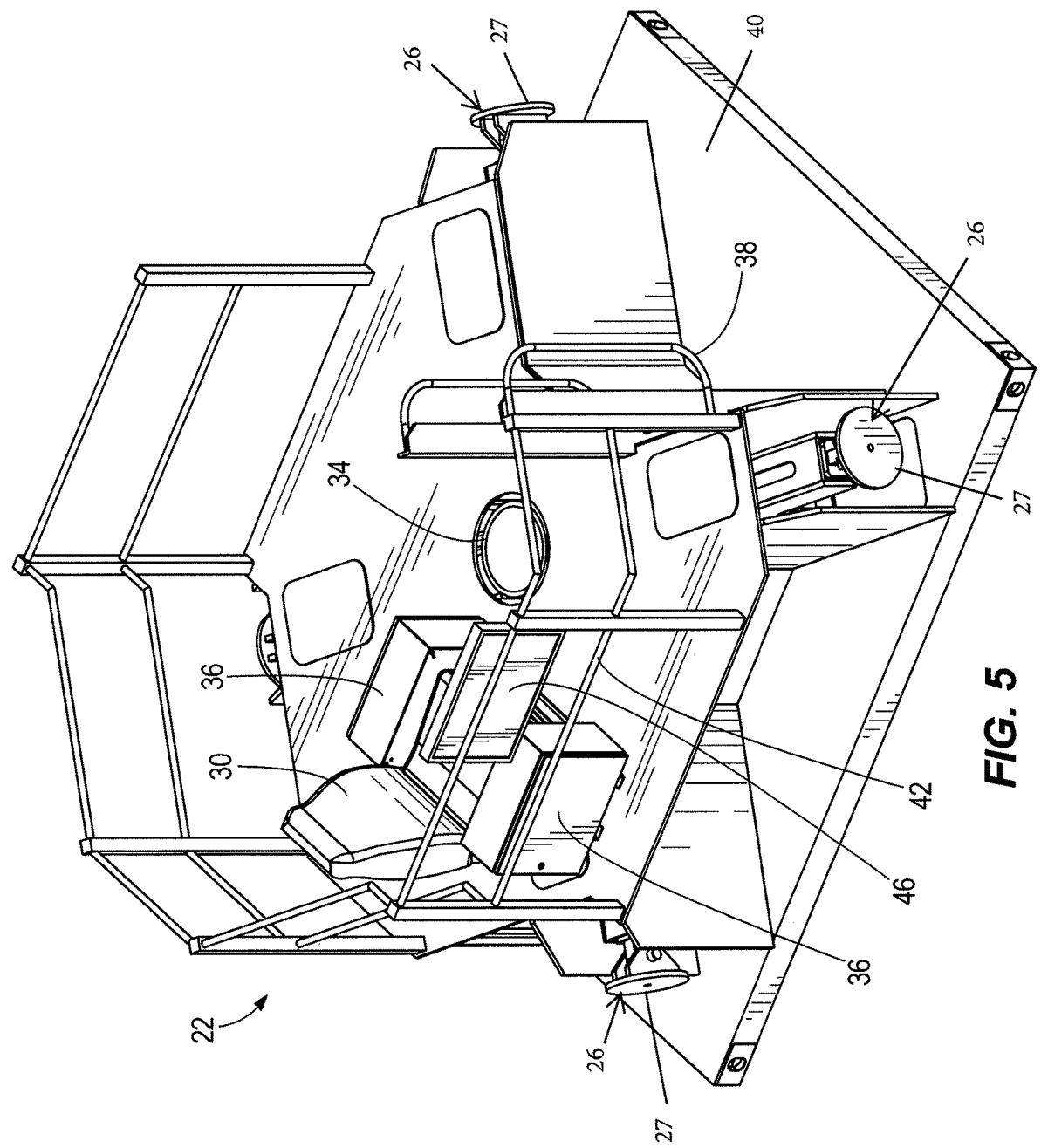
FIG. 5 is a perspective view of an operator base of the crane system.

With reference to FIGS. 1, 2, and 5, the skid assembly 16 includes an operator base 22 coupled to a plurality of outrigger assemblies 26. In the illustrated construction, four outrigger assemblies 26 are provided, spaced generally equally apart from one another (e.g., at 90 degree intervals around the operator base 22). The outrigger assemblies 26 act as legs or supports under the operator base 22. Each of the outrigger assemblies 26 includes a lower foot 27 that engages the ground surface 18. In some constructions, the feet 27 include a surface or surfaces that create traction, and prevent the outrigger assemblies 16 sliding or skidding along the ground surface 18. In the illustrated construction, the operator base 22 is welded directly to the outrigger assemblies 26. In other constructions, the operator base 22 is coupled to the outrigger assemblies 26 with fasteners or other structures. Other constructions include different numbers and locations of outrigger assemblies 26. FIG. 5 illustrates a stowed (e.g., retracted) position of the outrigger assemblies 26 and FIG. 1 illustrates a deployed (e.g., extended) position of the outrigger assemblies 26.

Figure 6:
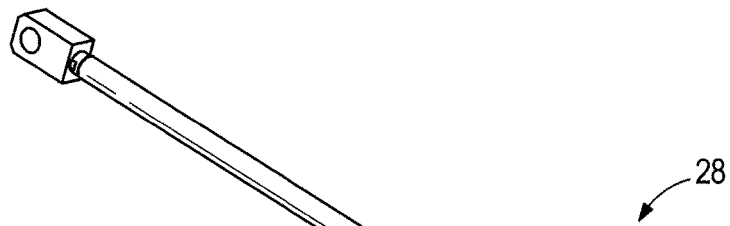
FIG. 6 is a perspective view of a hydraulic cylinder used in a skid assembly of the crane system.

With reference to FIGS. 1 and 6, in the illustrated construction, each of the outrigger assemblies 26 includes one or more hydraulic cylinders 28. The outrigger assemblies un-stow themselves (e.g., expand downward toward the ground surface 18) through sequenced kinematic motion of the one or more hydraulic cylinders 28 (FIG. 6).

With reference to FIGS. 1 and 5, in the illustrated construction, the operator base 22 rests on the flatbed semi trailer 14 and includes an operator chair 30 offset from a center component 34 (FIG. 5). In the illustrated construction, the operator chair 30 includes at least one side support 36. The operator base 22 also includes an access ladder 38, a lower plate 40 that rests on the semi trailer 14, and protective hand rails 42. The operator base 22 also includes a controller 46 (e.g., coupled to one of the hand rails 42) which includes a display that displays feeds from various system cameras 50, 54, 58, 62. Other constructions include different numbers and locations of system cameras. In some constructions no cameras are provided. Additionally, in other constructions the controller 46 or other similar component is provided in a different location than that shown.

In the illustrated construction, the operator base 22 further includes an engine 66 (e.g., a diesel engine) that drives a pump drive of a hydraulic generator 70. The hydraulic generator 70 supplies power to a hydraulic power unit 74. In some constructions, a switch gear is provided, which allows the hydraulic power unit 74 to work with remote power in the event zero emissions are required.

With reference to FIG. 1, the crane system 10 also includes a telescoping jib crane 78 coupled to the skid assembly 16. The jib crane 78 includes a pillar assembly 82 and a boom assembly 86 coupled to the pillar assembly 82.

The jib crane 78 deploys under operator control (e.g., via the controller 46) from a stowed (e.g., retracted) transport position to a deployed (e.g., extended) position through telescoping of both the pillar assembly 82 and the boom assembly 86, vertically and horizontally respectively.

With reference to FIGS. 1-4, the jib crane 78 is used to lift and move materials, such as portions of specially designed canisters 88 (FIGS. 2 and 4) filled with barrels 90 that contain radiological material. The barrels 90 are any type of container or element that is used to store material inside. In the illustrated construction the jib crane 78 is used to lift and move lids 92 (FIG. 1) of the canisters 88, and to also lift and move the barrels 90 themselves.

With reference to FIGS. 1 and 2, in the illustrated construction, the pillar assembly 82 includes a welded structural steel pipe construction that includes an outer pillar assembly 94 and a guided inner pillar assembly 96. Guided vertical travel and movement of the inner pillar assembly 96 is accomplished by an inner hydraulic cylinder (not shown).

The inner pillar assembly 96 is coupled directly to the boom assembly 86. In the illustrated construction, full rotation of 360 degrees of the boom assembly 86 is possible through a hydraulic/mechanical drive component 100 and a hydraulic/electrical slip ring component 104, which transfers hydraulic and electrical potential to the boom assembly 86.

Figure 7:
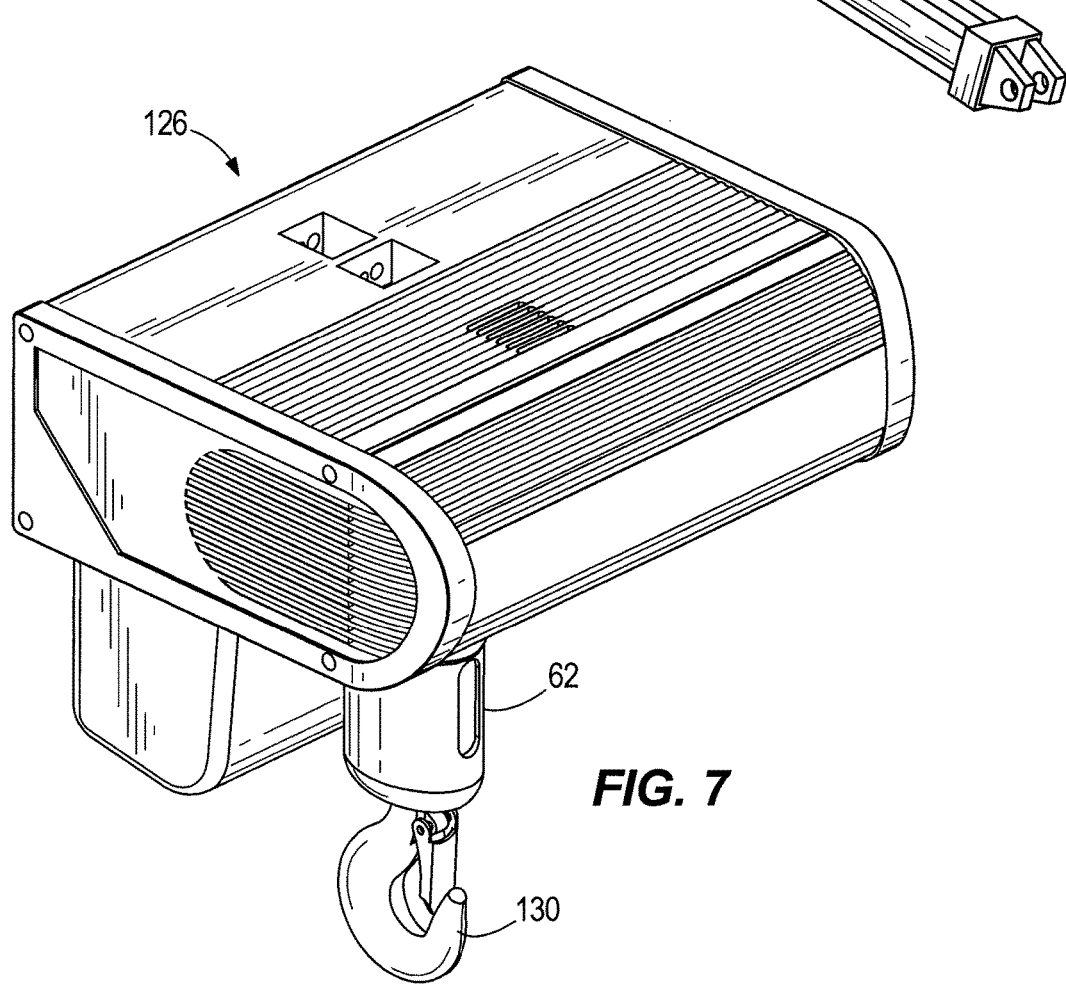
FIG. 7 is a perspective view of a grapple used on a boom assembly of the crane system.

With reference to FIGS. 1, 2, and 7, in the illustrated construction, the boom assembly 86 includes a welded structural steel box construction with multiple sections 108, 110, 114, 118, and 122, at least two of which (e.g., four of which) that move telescopingly relative to one another. In the illustrated construction, a first section 110 is coupled directly to the pillar assembly 82. A second section 114 is telescopingly coupled to the first section 110. A third section 118 is telescopingly coupled to the second section 114, such that the second section 114 is disposed between the first and third sections 110, 118. A fourth section 122, forming part of a distal end of the boom assembly 86, is telescopingly coupled to the third section 118, such that the third section 118 is disposed between the second and fourth sections 114, 122. In some constructions, the section 108 is an electrical control box for distribution of electrical power. In the illustrated construction, three hydraulic cylinders (e.g., located interior to one or more of the telescoping components 110, 114, 118, 122 are used to generate a telescoping horizontal movement of the boom assembly 98.

In the illustrated construction, one of the cameras 50 is coupled to the first section 110, and gives the operator a view of a loading area. Another of the cameras 54 is coupled to the pillar assembly 82 and provides the operator a view at a top elevation component of the canisters 88.

With continued reference to FIGS. 1, 2, and 7, a hoisting component 126 and another of the cameras 58 are coupled to an end of the fourth section 122. The camera 58 is in an orientation that gives the operator a bird's eye view from an end of the boom assembly 98 elevation. The hoisting component 126 includes a grapple 130 (FIG. 2) that is specifically designed to handle both the canister lids 92 and the barrels 90. The grapple 130 further includes another of the cameras 62, which gives the operator a closer bird's eye view of the grapple's interfacing with the canisters 88 and the barrels 90.

The crane system 10 is self-deploying, and may be coupled to various flatbed semi trailers. For example, after the outrigger assemblies 26 are un-stowed and the feet 27 contact the ground surface 18, the outrigger assemblies 26 then lift the operator base 22 (e.g., with the hydraulic cylinders 28) from a first elevation (e.g., a ground elevation) to a second elevation where a flatbed semi trailer (e.g., the flatbed semi trailer 14) can be maneuvered under the skid assembly 16. In some constructions, multiple non-retractable twist lock mechanical engagements are then used to secure the skid assembly 16 to the flatbed semi trailer.

The skid assembly 16 (and the coupled jig crane 78) are leveled horizontally and vertically via the hydraulic/mechanical outrigger assemblies 26. This allows the jib crane 78 vertical loading to be transmitted through the outrigger assemblies 26 to the ground surface 18. In some constructions, the flatbed semi trailer 14 is primarily used for stability and horizontal loading. In some constructions, the outrigger assemblies 26 provide all or substantially all of the vertical support for the operator base 22 as well as the telescoping jib crane 78.

Although the invention has been described in detail with reference to certain preferred embodiments, variations and modifications exist within the scope and spirit of one or more independent aspects of the invention as described.

What is claimed is:

1. A method of loading a barrel onto a semi trailer, the method comprising:
    providing a crane assembly, the crane assembly including:
        a skid assembly having an operator base, the skid assembly further including a plurality of outrigger assemblies coupled to the operator base to support and lift the operator base from a first elevation to a second elevation, and
        a jib crane coupled to the skid assembly, the jib crane having a pillar assembly coupled to the skid assembly, and a boom assembly coupled to the pillar assembly;
    using the outrigger assemblies of the crane assembly to lift the operator base from a first elevation to a second elevation;
    moving a semi trailer underneath the operator base;
    engaging a hoisting component of the jib crane to a barrel; and
    moving the barrel onto the semi trailer.

2. The method of claim 1, wherein the operator base includes a lower plate, further comprising resting the lower plate on the semi trailer, such that the semi trailer provides at least partial vertical support for the operator base.

3. The method of claim 1, wherein the outrigger assemblies provide all vertical support for the operator base.

4. The method of claim 1, further comprising securing the skid assembly to the semi trailer using non-retractable twist lock mechanical engagements.

5. The method of claim 1, further comprising monitoring movement of the barrel with a plurality of cameras coupled to the crane assembly.

6. The method of claim 1, wherein the steps of engaging the hoisting component with the barrel and moving the barrel include telescopically extending and retracting the pillar assembly.

7. The method of claim 1, wherein the steps of engaging the hoisting component with the barrel and moving the barrel include telescopically extending and retracting the boom assembly.

8. The method of claim 1, wherein the step of moving the barrel includes lowering the barrel into a canister that is positioned on the semi trailer.

9. The method of claim 8, further comprising engaging the hoisting component of the jib crane to a canister lid, and moving the canister lid onto the canister after the barrel has been moved into the canister.

10. The method of claim 1, wherein the hoisting component includes a grapple, and wherein the step of engaging the hoisting component to the barrel includes coupling the grapple to the barrel.

11. The method of claim 1, wherein the semi trailer is a flatbed semi trailer, and wherein the barrel includes radiological material.

12. A method of loading a barrel containing radiological material onto a flatbed semi trailer, the method comprising:
providing a crane assembly, the crane assembly including:
a skid assembly having an operator base, the skid assembly further including a plurality of outrigger assemblies coupled to the operator base to support and lift the operator base from a first elevation to a second elevation,
a jib crane coupled to the skid assembly, the jib crane having a pillar assembly coupled to the skid assembly, a boom assembly coupled to the pillar assembly, and a hoisting component coupled to the boom assembly, and
a plurality of cameras coupled to the jib crane;
engaging the hoisting component to a barrel that contains radiological material;
moving the barrel onto the flatbed semi trailer; and
monitoring the movement with the plurality of cameras.

13. The method of claim 12, wherein at least one of the plurality of cameras is coupled to the pillar assembly.

14. The method of claim 12, wherein the steps of engaging the hoisting component with the barrel and moving the barrel include telescopically extending and retracting the pillar assembly.

15. The method of claim 12, wherein the steps of engaging the hoisting component with the barrel and moving the barrel include telescopically extending and retracting the boom assembly.

16. The method of claim 12, wherein the step of moving the barrel includes lowering the barrel into a canister that is positioned on the semi-trailer.

17. The method of claim 16, further comprising engaging the hoisting component of the jib crane to a canister lid, and moving the canister lid onto the canister after the barrel has been moved into the canister.

18. The method of claim 12, wherein the hoisting component includes a grapple, and wherein the step of engaging the hoisting component to the barrel includes coupling the grapple to the barrel.

19. The method of claim 18, wherein the grapple includes one of the plurality of cameras.

20. The method of claim 12, wherein the operator base includes a controller having a display, and wherein the step of monitoring the movement includes displaying feeds from the plurality of cameras on the display.

* * * * *